Jan. 5, 1937.　　　C. N. BEBINGER　　　2,066,451
CARRIAGE FOR SHAKING CONVEYERS
Filed Nov. 11, 1935

Inventor
C. N. Bebinger
By Frease and Bishop Attorneys

Patented Jan. 5, 1937

2,066,451

UNITED STATES PATENT OFFICE 2,066,451

CARRIAGE FOR SHAKING CONVEYERS

Charles N. Bebinger, New Philadelphia, Ohio, assignor to La-Del Conveyor & Mfg. Co., New Philadelphia, Ohio, a corporation of Ohio Application November 11, 1935, Serial No. 49,125

7 Claims. (Cl. 198—220)

The invention relates to carriages for shaking conveyers, and more particularly to carriages for maintaining the conveyers in alignment by taking upward and downward thrust as well as lateral thrust, with a minimum of friction.

Certain prior constructions have provided guide frames having antifriction means at the sides of the conveyer for taking the vertical thrust of the conveyer, but said guide frames have had separate antifriction means located centrally of the conveyer for taking the lateral thrust, which means increases the weight of the conveyer and consequently increases the driving power required.

The centrally located means for taking lateral thrust usually includes a roller journalled in a position necessarily close to the floor, where it is surrounded by coal dust and the like, preventing its free and easy operation, which position is very inaccessible for lubrication purposes, so that great difficulty is experienced in the jamming of the roller which causes sliding friction.

In certain prior constructions where it has been attempted to dispense with the central antifriction means, the side antifriction means have not been designed for or made capable of taking upward and downward vertical thrust as well as lateral thrust, so that thrust in at least one vertical direction results in sliding friction; and such sliding friction greatly reduces the operating efficiency of the conveyer and requires excessive driving power.

In operating a shaking conveyer, the reciprocating motion thereof, particularly on uneven ground, tends to cause the conveyer troughs to buckle in a vertical plane, in addition to causing forces tending to bend the conveyer laterally. It is therefore especially important to provide means on the conveyer carriages to take the vertical thrust in both directions.

Accordingly, it is an object of the present invention to provide an improved aligning carriage for a shaking conveyer, which carriage has antifriction means located at the sides of the conveyer for taking upward and downward and lateral thrust transmitted from the conveyer.

Another object is to provide a carriage guide frame assembly having tracks for engaging antifriction means, and means for aligning the tracks during assembly and maintaining said alignment after assembly.

A further object is to provide an aligning carriage having antifriction means rolling on and between vertically spaced tracks, and means for adjusting the tracks to present new wearing surfaces.

A still further object is to provide an aligning carriage of simple construction having two side rollers only for taking thrust from the conveyer in all directions.

These and other objects are attained by the improvements comprising the present invention, which may be stated in general terms as comprising a carriage including flanged rollers rolling on vertically spaced rods at each side of the conveyer, which rods are circumferentially adjustable.

The invention is disclosed and described in detail in the drawing and specification forming part hereof, and is defined in the appended claims.

Referring to the drawing.

Similar numerals refer to similar parts throughout the several views of the drawing.

Figure 1:
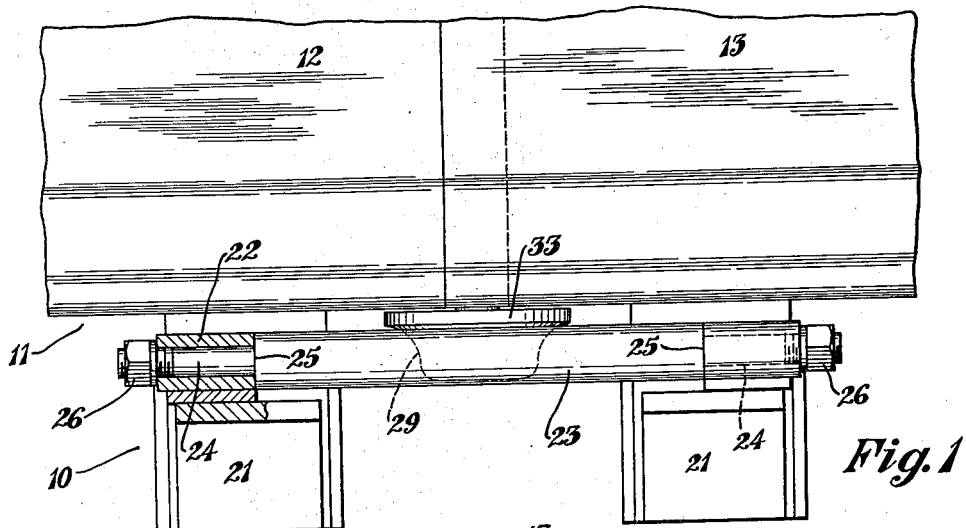
Figure 1 is a partial plan view of the improved carriage supporting a shaking conveyer, parts of the carriage being shown in section.

The improved aligning carriage is indicated generally at 10 in the drawing, and is shown supporting a shaking conveyer indicated generally at 11, the connected ends of two troughs 12 and 13 of the conveyer being shown supported by the improved carriage.

The adjoining ends of the troughs 12 and 13 each have a joint plate 14 secured thereto as by welding and extending transversely thereof, and each plate 14 is provided with an eye 15 at each side of the conveyer trough, so that bolts 16 or the like may be inserted through adjacent eyes for connecting adjoining troughs together; all in a usual manner.

Figure 2:
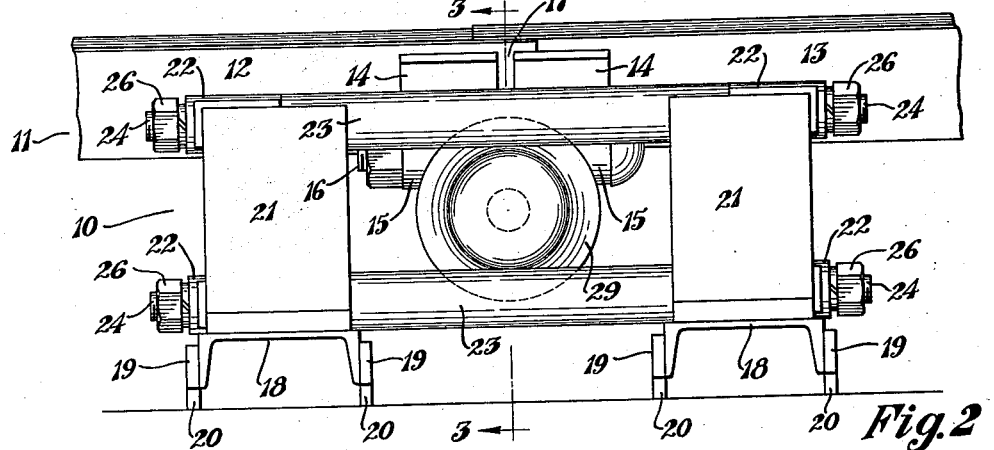
Fig. 2 is a side elevation thereof.

The conveyer troughs 12 and 13 are connected together so as to allow a space between adjacent plates 14, as indicated at 17 in Fig. 2, for a purpose to be described.

The improved carriage 10 includes a base for resting on the floor of a mine and the like, and as shown in the drawing, the base may consist of two longitudinally spaced channels 18 extending transversely of the conveyer and projecting laterally outward therefrom. The channels preferably have means for frictionally engaging the floor of the mine, and as shown in the drawing, such means may constitute plates 19 secured to the legs of the channels 18, and having serrations indicated at 20 for engaging the floor of the mine.

Preferably, upright members such as the angles 21, are secured one to each end of each channel 18, as by welding and the like. Each upright member has secured thereto as by welding a pair of vertically spaced sleeves or tubular members 22, and each sleeve is adapted to be longitudinally aligned with a sleeve 22 on the other upright member 21 at the same side of the base. The channels 18, upright members 21 and tubular members 22 form a supporting frame for the improved carriage.

Preferably, a pair or set of vertically spaced rods 23 is provided at each side of the base, and each rod is slidably and rotatably mounted in two aligned tubular portions 22, at each side of the conveyer.

Each rod 23 is preferably of hardened steel and has reduced end portions 24 forming shoulders 25, and the reduced portions 24 are adapted to be inserted in aligned tubular portions 22 at one side of the conveyer. The shoulders 25 of each rod are adapted to abut the inner ends of the tubular portions 22, and the reduced portions 24 are threaded on their outer ends and provided with nuts 26 for drawing the shoulders 25 into clamping abutment with the ends of the tubular portions 22. The shoulders 25 of each rod 23 are formed accurately to be at right angles to the axis of the rod 23, and the inner end faces of the tubular portions 22 are formed at right angles to the axes of said portions, so that when the nuts 26 are turned to clamp shoulders of the rods against the tubular portions 22, the whole supporting frame of the carriage will be squared and the rods 23 longitudinally aligned.

The vertically spaced rods 23 at each side of the conveyer are preferably cylindric as shown, providing longitudinally disposed tracks of circular cross section, on which the antifriction means rolls, and the track rods 23 are assembled with the supporting frame to form a guide frame assembly for guiding the antifriction rollers.

The antifriction means for rollably supporting the conveyer troughs on the track rods 23 preferably includes a shaft 28 extending transversely of the conveyer troughs, and having a flanged roller 29 journalled on each end thereof. The flanged rollers 29 may be journalled on the ends of the shaft 28 by means of bearings 30 of usual construction mounted within the rollers, and packing and sealing means indicated at 31 is provided around the shaft at the inside of each bearing 30 and held in place by a closure 32 secured to the roller.

Each roller 29 is shown in the drawing as having an inner flange 33, and the outer rim surface or track engaging surface is preferably hardened and transversely curved as shown at 35.

Each roller 29 is mounted so as to roll on and between the vertically spaced rods 23 at one side of the conveyer, and the radius of curvature of the rim surface of each roller is substantially greater than the radius of curvature of the track rods 23, so that point contact is provided for between each roller and the rods 23.

By loosening the nuts 26 at each end of any rod 23, the rod may be axially turned to present a new wearing surface for point contact with the roller 29 adapted to roll thereon.

For the purpose of lubricating the bearings 30, an ordinary lubricant fitting 31 may be provided on the shaft 28 adjacent each roller 29, and the fitting communicates with a passage 38 in the shaft leading to the compartment housing the bearing 30.

The shaft 28 and rollers 29 rollably support the conveyer troughs on the track rods 23, and the shaft is connected to the conveyer troughs by means of ears 40 welded or otherwise secured to the shaft and projecting upwardly therefrom. Said ears 40 may project into the space 17 provided between the joint plates 14, and each ear is provided with a bolt aperture for registering with the eyes 15, so that the bolts 16 which connect the joint plates together may pass through the ears. Obviously the ears 40 may be positioned at one side of either plate 14 for being connected thereto by the bolts 16.

Figure 3:
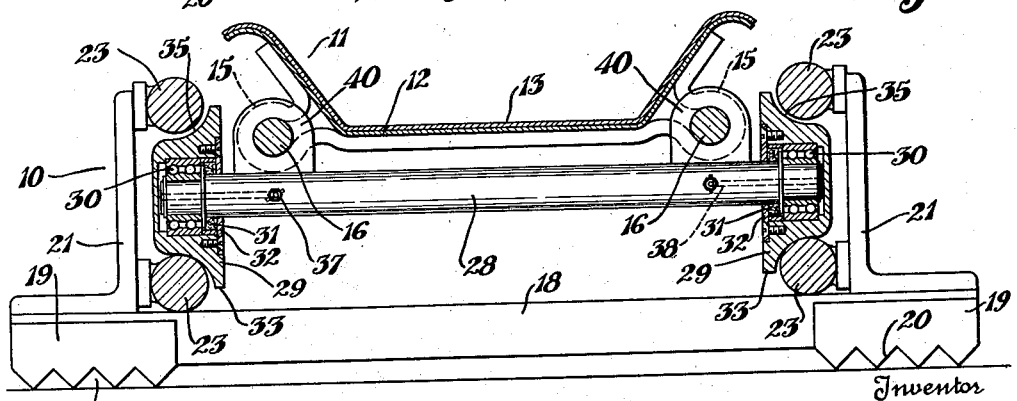
Fig. 3 is a transverse sectional view as on line 3—3, Fig. 2.

The two rollers 29 located one at each side of the conveyer, and rolling on and between the vertically spaced track rods 23, provide antifriction means for taking upward and downward and lateral thrust transmitted from the conveyer. In Fig. 3, the rollers are shown in their normal position with the weight of the conveyer causing the rollers to ride on the lower rods 23, providing point contact therewith and taking downward thrust.

During the reciprocation of the conveyer, any forces tending to buckle or move the troughs of the conveyer upwardly will cause the rollers to roll on the upper rods 23, and provide point contact therewith for taking upward thrust.

Any forces tending to move or bend the conveyer troughs laterally will cause the flange portion of the transversely curved rim surface of one of the rollers to engage one or both of the rods 23 at that side of the conveyer to take the lateral thrust and due to the difference in curvature between the rim and the rods, point contacts will always be provided between the roller and the rods.

Thus, the improved aligning carriage, including the guide frame and the two flanged rollers, provides antifriction means for guiding the conveyer troughs during reciprocation against displacement in any direction except longitudinal. Moreover, by loosening the nuts 26, the rods 23 may be easily turned or axially rotated to present new wearing surfaces to the rollers at any time.

When the supporting frame is assembled with the antifriction rollers and track rods 23, the shoulders 25 are drawn into abutment with the end faces of the tubular portions 22 by means of the nuts 26, so as to accurately align the rods 23 with the conveyer and to maintain said alignment after the carriage is assembled.

The improved aligning carriage is simple and inexpensive to construct, and is easily accessible for lubrication and inspection purposes.

I claim:—
1. An aligning carriage for a shaking conveyer, including a base, a set of vertically spaced cylindric rods axially rotatably mounted at each side of the base, means detachably mounting the rods in accurate alignment on the base, a shaft extending transversely of the rods, and flanged rollers journalled on the ends of the shaft and rollably mounted on and between each set of vertically spaced rods.

2. An aligning carriage for a shaking conveyer, including a base, a set of vertically spaced rods at each side of the base, means mounting the rods in accurate alignment on the base for axial rotation, adjustable means clamping the rods to the mounting means, and a conveyor-supporting flanged roller rolling on and between each set of vertically spaced rods.

3. An aligning carriage for a shaking conveyer, including a base, an upright member mounted on each side of said base and having vertically spaced longitudinally aligned tubular portions, cylindric rods rotatably mounted in said longitudinally aligned tubular portions and having shoulders, means clamping said shoulders in abutment with said tubular portions, and a flanged conveyer-supporting roller rolling on and between each set of vertically spaced rods.

4. An aligning carriage for a shaking conveyer, including a base, vertically spaced cylindric rods axially rotatably mounted at each side of the base, means clamping the rods to the base, a shaft extending transversely of the rods, and rollers journalled on the shaft and having transversely curved rims rolling on and between said vertically spaced rods, the curve of said rims having a larger radius than that of the rods for providing point contact therewith.

5. An aligning carriage for a shaking conveyer, including a base, longitudinally disposed vertically spaced cylindric members mounted on the base at each side thereof, a shaft extending transversely between the members, and rollers journalled on the ends of the shaft and rollably mounted on and between the vertically spaced members at each side of the base, each roller having a rim transversely curved on a larger radius than the vertically spaced cylindric members for providing point contact with the vertically spaced members.

6. In a shaking conveyer having troughs connected end to end, transverse joint plates on the adjoining ends of said troughs and having registering bolt eyes at each side thereof, a shaft extending transversely under the conveyer, upright ears secured to the shaft extending between the bolt eyes of adjacent joint plates for connection therewith, a base under the conveyer, a pair of vertically spaced longitudinal members on the base at each side of the conveyer, and a flanged roller journalled on each end of the shaft rolling between each pair of vertically spaced members.

7. An aligning carriage for a shaking conveyer, including a base, an upright member mounted on each side of said base and having longitudinally aligned sets of vertically spaced tubular portions, cylindric rods rotatably mounted in longitudinally aligned tubular portions, means clamping said rods to said tubular portions for maintaining said rods in parallel relation, and a flanged conveyer-supporting roller rolling on and between each set of vertically spaced rods and providing a point contact therewith.

CHARLES N. BEBINGER.